United States Patent
Lee et al.

(10) Patent No.: US 6,645,383 B1
(45) Date of Patent: Nov. 11, 2003

(54) PROCESS AND APPARATUS FOR BLENDING PRODUCT LIQUID FROM DIFFERENT TFC MEMBRANES

(75) Inventors: Barry H. Lee, Des Plaines, IL (US); Gene Wayman, Fox River Grove, IL (US); John Van Newenhizen, Mundelein, IL (US)

(73) Assignee: USF Consumer & Commercial Watergroup, Inc., Northbrook, IL (US)

( * ) Notice: Subject to any disclaimer, the term of this patent is extended or adjusted under 35 U.S.C. 154(b) by 0 days.

(21) Appl. No.: 09/645,898

(22) Filed: Aug. 25, 2000

(51) Int. Cl.$^7$ ................................................ B01D 61/00
(52) U.S. Cl. ................ 210/652; 210/653; 210/641; 210/257.2
(58) Field of Search .............. 210/652, 195.2, 210/257.2, 651, 653, 641

(56) References Cited

U.S. PATENT DOCUMENTS

| | | | |
|---|---|---|---|
| 4,046,685 A | | 9/1977 | Bray |
| 4,083,779 A | | 4/1978 | Combe et al. |
| 4,773,991 A | * | 9/1988 | Aid |
| 4,908,133 A | | 3/1990 | Wuest et al. |
| 4,988,445 A | * | 1/1991 | Fulk, Jr. |
| 5,112,483 A | | 5/1992 | Cluff |
| 5,147,553 A | * | 9/1992 | Waite |
| 5,238,574 A | | 8/1993 | Kawashima et al. |
| 5,282,972 A | * | 2/1994 | Hanna et al. |
| 5,460,723 A | | 10/1995 | Bourbigot |

(List continued on next page.)

FOREIGN PATENT DOCUMENTS

| | | |
|---|---|---|
| EP | 0 402 121 A1 | 12/1990 |
| EP | 0 520 920 A1 | 12/1992 |
| JP | 10305216 | 11/1998 |

OTHER PUBLICATIONS

S. Besquet et al, "New composite membranes for water softening," Desalination 131 (2000)299–305.*

(List continued on next page.)

*Primary Examiner*—Ana Fortuna
(74) *Attorney, Agent, or Firm*—Greer, Burns & Crain, Ltd.

(57) ABSTRACT

A process and apparatus for membrane treatment of a feed liquid to form a product liquid includes feeding a feed liquid, typically an aqueous solution such as tap water, to a primary membrane. The primary membrane separates the feed liquid into a primary membrane retentate which is retained by the primary membrane, and a primary membrane permeate. The primary membrane retentate is then fed to one or more supplemental primary membranes, or to a secondary membrane. The primary membrane retentate (or supplemental primary membrane retentate if a supplemental primary membrane is employed) is separated by the secondary membrane into a secondary membrane retentate which is retained by the secondary membrane, and a secondary membrane permeate passes through the secondary membrane. The secondary membrane retentate may either be collected and disposed of, or may be fed to one or more supplemental secondary membranes. If the secondary membrane retentate is fed to a supplemental secondary membrane, the secondary membrane retentate (or retentate from a prior supplemental secondary membrane) is separated into a supplemental secondary membrane retentate and supplemental secondary membrane permeate. The final product liquid is formed by blending the primary membrane permeate with the secondary membrane permeate and, if applicable, all supplemental primary membrane permeates and supplemental secondary membrane permeates.

12 Claims, 1 Drawing Sheet

U.S. PATENT DOCUMENTS

| | | | |
|---|---|---|---|
| 5,501,798 A | * | 3/1996 | Al-Samdi |
| 5,575,918 A | * | 11/1996 | Virnig et al. |
| 5,597,487 A | | 1/1997 | Vogel et al. |
| 5,607,592 A | * | 3/1997 | Bernard et al. |
| 5,635,071 A | * | 6/1997 | Al-Samdi |
| 5,685,990 A | * | 11/1997 | Saugmann et al. |
| 5,879,558 A | | 3/1999 | Monroe et al. |
| 6,103,125 A | * | 8/2000 | Kuepper |
| 6,113,797 A | * | 9/2000 | Al-Samadi |
| 6,162,361 A | * | 12/2000 | Adiga |
| 6,187,200 B1 | * | 2/2001 | Yamamura et al. |
| 6,258,276 B1 | * | 7/2001 | Mika et al. |

OTHER PUBLICATIONS

Günther Pohle, "Umkehrosmose–Entwicklung und Ausblick für das Spiralwickelmodul nach 10 Jahren Anwendungstechnik" Wärme, vol. 86, No. 6, Dec. 1980, pp. 120–126, XP002197943.

"Ensure the Best Performance from Membranes and Demineralizers" Power, Mcgraw–Hill. New York, US, vol. 137, No. 3, Mar. 1, 1993, p. 73, 74, 76, 78, XP000359945.

* cited by examiner

US 6,645,383 B1

PROCESS AND APPARATUS FOR BLENDING PRODUCT LIQUID FROM DIFFERENT TFC MEMBRANES

FIELD OF THE INVENTION

The present invention relates generally to a process and apparatus for the treatment of water using membrane technology to separate the constituents of a feed liquid, and specifically to a process and apparatus for purification and blending of an aqueous solution utilizing one or more first membrane process units having a first permeability connected in series with one or more second membrane-process units having a second permeability to produce a desired blended product water thus modified to improve its taste characteristics.

BACKGROUND OF THE INVENTION

The following expressions are defined to provide a better understanding of the present specification and claims.

Thin film composite membrane (TFC) process: Purification of liquid occurs through a thin film composite membrane where a feed liquid is separated into retentate and a permeate.

Retentate: The portion of a feed liquid which is retained by a membrane.

Permeate: The portion of a feed liquid which passes through a membrane.

Nanofiltration (NF): Filtration of a liquid through a NF-membrane. Such membranes are usually ion-selective and reject ions at varying percentages depending on the total molarity of the feed liquid and the chemistry of the membrane. Further, such filtration membranes typically have a pore size of 0.0007 $\Phi m$ to 0.007 $\Phi m$, such pore sizes corresponding to a molecular cutoff value ranging from 140 Å to 15,000 Å.

Reverse osmosis (RO): A liquid separation process in which a solution is put through a semi-permeable membrane that excludes most soluble ions thus concentrating undesired soluble and insoluble species in the retentate. Such membranes allow the passage of some ions in the size range of 0 $\Phi m$ to 0.0015 $\Phi m$, which corresponds to a molecular cutoff value of between 0 Å and 300 Å. RO separation of solution where water is the solvent typically results in a permeate consisting of only water with most ions being exluded.

Permeable solutes: Substances dispersed in the liquid which are capable of passing through the membrane employed. Such substances may be electrolytes, nonelectrolytes, colloidal dispersions, and/or particles.

Feed liquid: Liquid fed to the first of a series of membrane process units. Such a liquid could be a solution wherein the solutes may be dissolved and/or undissolved. Undissolved material may need to be filtered out before the membrane processes.

Hardness: The combined concentrations of magnesium and calcium salts as measured by $CaCO_3$.

Alkalinity: The measure of carbonate, bicarbonate, and hydroxide as $CaCO_3$.

When a feed liquid is fed into a membrane process unit, the feed liquid is separated into a retentate and a permeate. The permeate is the portion of the feed liquid which passes through a membrane contained within the process unit. Contained within the permeate are permeable solutes. Those solutes which are not capable of passing through the membrane being employed, or non-permeable solutes, are retained within the retentate.

Whether a solute is permeable or non-permeable depends upon the type of membrane used. Certain membranes may be employed which exclude solutes based upon molecular size. As the permeability or pore size increases, so does the passage of the permeable solutes. In addition, an ion selective membrane may be employed which excludes a solute based upon its charge.

Separation by the reverse osmosis process, and more particularly, purification of water by reverse osmosis in order to produce drinkable or potable water, is known. U.S. Pat. No. 5,238,574 to Kawashima et al. describes an apparatus for treating salt water using a plurality of reverse osmosis membrane units. However, a disadvantage of these types of membrane systems is that they produce product water which is of such a high quality that its taste characteristics may be unacceptable. These unacceptable taste characteristics result because the permeates produced by such reverse osmosis membrane systems tend to have low alkalinity levels, and significantly reduced levels of dissolved salts. As a result, the product water has an off taste or a "flat" taste.

The poor taste characteristics of product water produced by reverse osmosis can be overcome by two known post-filtration blending methods. The first method employs blending a portion of the feed liquid or untreated water with the permeate to produce product water having desired levels of alkalinity and dissolved salts. A disadvantage of this method is that it requires constant adjustment of the volume of untreated water needed for blending. The constant adjustment of the volume of feed water is due to the constantly changing chemical characteristics and pressure of the feed water. Also, introduction of untreated water back into the product water reduces the attainable benefits of the membrane processes in removing unwanted substances from the feed water.

The second method employs the addition of minerals to the permeate to achieve the desired taste characteristics. This latter method is undesirable due to its high cost and inefficiency, since the membrane process removed the existing minerals in the first place.

Therefore, it is a first object of the present invention to provide an improved process and apparatus for treating a feed liquid to produce a product liquid having certain desired physical properties, resulting in improved taste.

A second object of the present invention is to provide an improved process and apparatus for treating a feed liquid without the necessity of blending a portion of the feed liquid with the permeate in order to produce a product liquid having certain desired physical properties.

It is a further object of the present invention to provide an improved process and apparatus for treating drinking water by membrane processes without the necessity of introducing minerals to the permeate to produce a product liquid having desired taste properties.

It is another object of the present invention to provide an improved process and apparatus for treating drinking water using membrane processes having different permeablities or porosities which can be arranged to produce a blended product liquid having certain desired chemical characteristics regardless of the chemical properties of the feed liquid.

SUMMARY OF THE INVENTION

The above-listed objects are met or exceeded by the present process and apparatus for membrane processing of a feed liquid to produce a product liquid. In the present system, at least two distinct membrane types are employed, each type having a distinct permeability. Permeates of the two types are blended to produce a treated product liquid having the desired water quality. Preferably, the permeability of the first type of membrane unit has a higher solid content than the second type, where the retentate of the first type is the feed liquid for the second type.

More specifically, to produce the product liquid, a feed liquid, typically an aqueous solution such as tap water, is first fed to a primary membrane type. The primary membrane separates the feed liquid into a primary membrane retentate which is retained by the primary membrane, and a primary membrane permeate. The primary membrane retentate is then fed to a secondary membrane type. The secondary membrane separates the primary membrane retentate into a secondary membrane retentate which is retained by the secondary membrane, and a secondary membrane permeate. The final product liquid is formed by blending the primary membrane permeate with the secondary membrane permeate.

In the preferred embodiment, the primary membrane produces water of poorer quality than the secondary membrane. This is because the permeable solute concentration of the primary membrane permeate is greater than the permeable solute concentration of the secondary membrane permeate. Thus, the final product liquid is a blend of the products of two different levels of membrane treatment. In this manner, the taste of product drinking water can be adjusted without introducing untreated water, and without adding supplemental minerals.

Alternate embodiments include the addition of one or more supplemental primary membranes connected in series with the primary membrane, and also include one or more supplemental secondary membranes connected in series with the secondary membrane. In this case, the primary membrane retentate is fed to a first supplemental primary membrane, and the retentate formed by the first supplemental primary membrane is fed to a second supplemental primary membrane. The retentate formed by the last supplemental primary membrane is then fed to the secondary membrane as feed liquid. The secondary membrane retentate formed by the secondary membrane may either be collected and disposed of, or may be fed to one or more supplemental secondary membranes. If the secondary membrane retentate is fed to a supplemental secondary membrane, the secondary membrane retentate (or retentate from a prior supplemental secondary membrane) is separated into a supplemental secondary membrane retentate and supplemental secondary membrane permeate.

The product water is formed by blending the primary membrane permeate and all permeates formed by the supplemental primary membranes with the secondary membrane permeate and all permeates formed by the supplemental primary membranes.

DESCRIPTION OF THE PREFERRED EMBODIMENT

Figure 1:
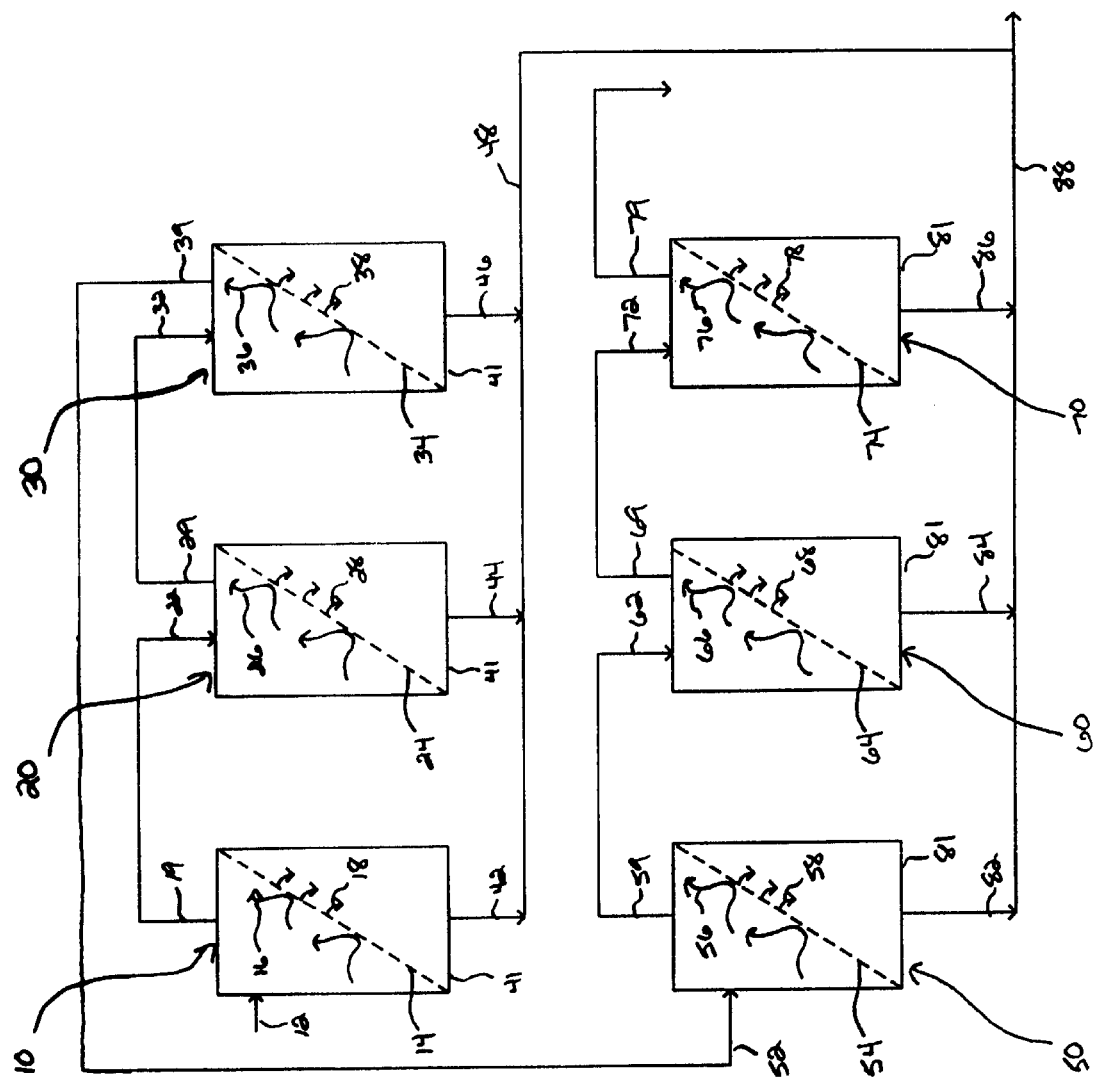
FIG. 1 is a schematic diagram of the present membrane treatment system, which is suitable for use with the present method.

Referring now to FIG. 1, an apparatus for membrane separation of a feed liquid to form a product liquid is schematically shown. A feed liquid, typically an aqueous solution such as tap water, is introduced into a primary membrane unit 10 through a primary membrane unit feed liquid inlet 12. A primary membrane 14 contained within the primary membrane unit 10 separates the feed liquid into a primary membrane retentate (indicated by arrows 16) which is retained by the primary membrane 14, and a primary membrane permeate (indicated by arrows 18) formed when the feed liquid passes through the primary membrane 14.

From the primary membrane unit 10, the primary membrane retentate 16 is removed through a primary membrane unit retentate outlet 19 and introduced into a first supplemental primary membrane unit 20 through a first supplemental primary membrane unit inlet 22. A first supplemental primary membrane 24 contained within the first supplemental primary membrane unit 20 separates the primary membrane retentate 16 into a first supplemental primary membrane retentate (indicated by arrows 26) which is retained by the first supplemental primary membrane 24, and a first supplemental primary membrane permeate (indicated by arrows 28) formed when the primary membrane retentate passes through the first supplemental primary membrane.

The first supplemental primary membrane retentate 26 is removed from the first supplemental primary membrane unit 20 through a first supplemental primary filtration unit retentate outlet 29 and introduced into a second supplemental primary membrane unit 30 through a second supplemental primary membrane unit inlet 32. A second supplemental primary membrane 34 contained within the second supplemental primary membrane unit 30 separates the first supplemental primary membrane retentate 26 into a second supplemental primary membrane retentate (indicated by arrows 36) which is retained by the second supplemental primary membrane 34, and a second supplemental primary membrane permeate (indicated by arrows 38). The second supplemental primary membrane permeate 38 is formed when the first supplemental primary membrane retentate 28 passes through the second supplemental primary membrane 34.

The primary membrane permeate 18, first supplemental primary membrane permeate 28, and the second supplemental primary membrane permeate 38 each are fed through a primary membrane unit permeate outlet 42, a first supplemental primary membrane unit permeate outlet 44, and a second supplemental primary membrane unit permeate outlet 46, respectively, and combined or blended together at a primary feed line 48.

In the preferred embodiment, each of the primary membranes 14, 24, 34 are identical, although the use of distinct membranes or types of membranes is contemplated depending on the desired characteristics of the final product water. More specifically, the primary membrane 14, 24, 34 is a nanofiltration membrane. Various nanofiltration membranes are commercially available and may vary with respect to their performance characteristics. Further, the physical properties of the permeate produced depend upon the physical properties of the feed liquid. While three nanofiltration units are depicted in FIG. 1, namely, the primary membrane unit 10, the first supplemental primary membrane unit 20, and the second supplemental primary membrane unit 30, the invention is not so limited. One or more nanofiltration units, each having a housing 41 as well as identical performance characteristics or having varying performing characteristics with respect to each other, may be used to produce a product liquid having the desired physical properties. Variation of the number of nanofiltration units is contemplated where the feed liquid is tap water, because the physical properties of tap water vary worldwide. However, it is contemplated that one with ordinary skill in the art would be able to select and determine, without undue experimentation, the number of nanofiltration units necessary to produce a product liquid having the desired physical properties at a sufficient low rate.

Further membrane treatment is performed by feeding the second supplemental primary membrane retentate 36 from the second primary membrane unit 30 through a second supplemental primary membrane unit retentate outlet 39. The second supplemental primary membrane retentate 36 is then introduced through a secondary membrane unit feed liquid inlet 52 into a secondary membrane unit 50. However, where treatment is performed using one or more primary membrane units (10, 20, 30), the liquid preferably introduced into the secondary membrane unit 50 will be the retentate formed by the last operating primary membrane unit. For example, if only the primary membrane unit 10 were employed, then the primary membrane retentate would then be introduced into the secondary membrane unit 50 through the secondary membrane unit feed liquid inlet 52.

Contained within the secondary membrane unit 50 is a secondary membrane 54. The secondary membrane 54 separates the second supplemental primary membrane retentate 36 into a secondary membrane retentate (indicated by arrows 56) retained by the secondary membrane 52, and a secondary membrane permeate (indicated by arrows 58). The secondary membrane permeate 58 is formed when the second supplemental primary membrane retentate 36 passes through the secondary membrane 54.

From the secondary membrane unit 50, the secondary membrane retentate 56 is removed through a secondary membrane unit permeate outlet 59 and preferably introduced into a first supplemental secondary membrane unit 60 through a first supplemental secondary membrane unit inlet 62. Alternatively, the permeate 56 is disposed of. A first supplemental secondary membrane 64 contained within the first supplemental secondary membrane unit 60 separates the secondary membrane retentate 56 into a first supplemental secondary membrane retentate (indicated by arrows 66) which is retained by the first supplemental secondary membrane 64, and a first supplemental secondary membrane permeate (indicated by arrows 68). The first supplemental secondary membrane permeate 68 is formed when the secondary membrane retentate 56 passes through the first supplemental secondary membrane 64.

The first supplemental secondary membrane retentate 66 is removed from the first supplemental secondary membrane unit 60 through a first supplemental secondary membrane unit retentate outlet 69 and either sent to drain or introduced into a second supplemental secondary membrane unit 70 through a second supplemental secondary membrane unit inlet 72. A second supplemental secondary membrane 74 contained within the second supplemental secondary membrane unit 70 separates the first supplemental secondary membrane retentate 66 into a second supplemental secondary membrane retentate (indicated by arrows 76) which is retained by the second supplemental secondary membrane 74, and a second supplemental secondary membrane permeate (indicated by arrows 78). The second supplemental secondary membrane permeate 78 is formed when the first supplemental secondary membrane retentate 66 passes through the second supplemental secondary membrane 74.

The secondary membrane permeate 58, first supplemental secondary membrane permeate 68, and second supplemental secondary membrane permeate 78 are fed through a secondary membrane unit permeate outlet 82, a first supplemental secondary membrane unit permeate outlet 84, and a second supplemental secondary membrane unit permeate outlet 86, respectively, and combined or blended together at a secondary feed line 88. The liquid contents of the primary feed line 48 and the liquid contents of the secondary feed line 88 are then combined or blended together forming the product liquid. The second supplemental secondary membrane retentate 76 is then removed from the second supplemental secondary membrane unit 70 through a second supplemental secondary membrane unit retentate outlet 79 and disposed of.

In the preferred embodiment, the secondary membranes 54, 64, 74 are reverse osmosis membranes. Various types of reverse osmosis membranes are commercially available and may vary with respect to their performance characteristics. The desired physical properties of the product liquid and the required production rate will therefore govern the selection of the reverse osmosis membrane and the number of reverse osmosis membranes to be employed.

While three reverse osmosis membrane units are depicted in FIG. 1, namely, the secondary membrane unit 50, the first supplemental secondary membrane unit 60, and second supplemental secondary membrane unit 70, the invention is not so limited. One or more reverse osmosis units, each having a housing 81, as well as identical performance characteristics or having varying performing characteristics with respect to each other, may be used to produce a product liquid having the desired physical properties. It is also contemplated that, while in the preferred embodiment, the secondary membranes 54, 64, 74 have substantially identical separation properties, depending on the desired characteristics of the product water, they may be different from each other. One with ordinary skill in the art could select and determine, without undue experimentation, the number of reverse osmosis units necessary to produce a product liquid having the desired physical properties at an acceptable flow rate.

EXAMPLE 1

The ranges of acceptable hardness and alkalinity concentrations in the product water were determined by varying the number of reverse osmosis units and nanofiltration units employed. It is known in the art that the upper limits for both hardness and alkalinity are 100 ppm. After conducting a taste panel, product water having a hardness concentration of at least 20 ppm and an alkalinity concentration of at least 21 ppm was found to be superior to product water having lower concentrations.

EXAMPLE 2

The quality of product water produced as a function of the membrane employed was determined.

The Culligan RO-A6 Series reverse osmosis membrane is available from Culligan International Company of Northbrook, Ill. The Filmtec NF-255 nanofiltration <membrane and thee,Filmtec NF-45 nanofiltration membrane are available from Filmtec Corporation located in Minneapolis, Minn. By definition, nanofilters are rated to have greater permeability or porosity, and a corresponding greater solute solids concentration than the RO membranes.

In each test, a total of six membranes were employed to produce the tested product water: two sets or "banks" of membranes, each set or bank having three identical membranes. Banks were inserted or removed to change the membrane combinations. The feed water used in each test was from a single source. Product water test samples were collected after one hour of continuous service. The feed water and the resulting product water for each combination possessed the following characteristics.

TABLE 1

| Combination | Hardness (ppm) | Alkalinity (ppm) | pH | Filtration Pressure (psig) | Flow Rate (gpm) |
|---|---|---|---|---|---|
| Untreated water | 334 | 262 | 7.36 | — | — |
| NF-45(3) -- NF-255(3) | 76 | 124 | 7.02 | 128 | 4.4 |
| Untreated water | 332 | 256 | — | — | — |
| NF-45(3) -- RO(3) | 6 | 38 | 6.64 | 135 | 4.4 |
| Untreated water | 338 | 260 | — | — | — |
| NF-255(3) -- RO(3) | 50 | 78 | 7 | 140 | >5 |

Hardness was determined by endpoint titration using ethylenediaminetetraacetic acid (EDTA) as the titrant, as outlined in Standard Methods 2340C (EDTA Tiration Method). Alkalinity was determined by Standard Methods #2320B (Alkalinity Titration Method).

From the results of Table 1, it will be seen that the use of nanofilters and RO membrane units in combination to create a blended product water provided better results, in that they were closer to the target hardness and alkalinity values, than the exclusive use of nanofilters in series.

While a particular embodiment of the process and apparatus for blending product from different membrane types has been shown and described, it will be appreciated by those skilled in the art that changes and modifications may be made thereto without departing from the invention in its broader aspects and as set forth in the following claims.

What is claimed is:

1. A process for membrane separation of a supply of potable tap water for obtaining a treated drinking water product having desired taste characteristics, comprising:

selecting at least one nanofiltration primary membrane from a plurality of nanofiltration primary membranes;

selecting at least one reverse osmosis secondary membrane from a plurality of reverse osmosis secondary membranes;

feeding said tap water to said selected at least one nanofiltration primary membrane, said at least one primary membrane separating said water into a primary membrane retentate retained by said at least one primary membrane, and a primary membrane permeate;

feeding said primary membrane retentate directly to said selected at least one reverse osmosis secondary membrane, said at least one secondary membrane separating said primary membrane retentate into a secondary membrane retentate retained by said at least one secondary membrane, and a secondary membrane permeate;

and blending said primary membrane permeate and said secondary membrane permeate to form a product drinking water by directly passing said primary membrane permeate and said secondary membrane permeate to a permeate blending point;

wherein a solute concentration of said primary membrane permeate is greater than a solute concentration of said secondary membrane permeate, and said blending of permeates having distinct concentrations creates a drinking water product having desired taste characteristics without adding supplemental minerals or untreated water post treatments, said desired taste characteristics being represented by a hardness value in the approximate range of between 20–100 ppm and an alkalinity value in the approximate range of between 21 and 100 ppm, said process including varying the number of at least one of said at least one nanofiltration primary membranes and said at least one reverse osmosis secondary membranes to achieve taste characteristics in said range.

2. The process of claim 1, wherein said primary membrane is an ion selective nanofiltration membrane.

3. The process of claim 1, further including sequentially feeding said primary membrane retentate to a supplemental nanofiltration primary membrane for separating said primary membrane retentate into a supplemental primary retentate and a supplemental primary permeate.

4. The process of claim 3, further including sequentially feeding said secondary membrane retentate to a supplemental reverse osmosis secondary membrane for separating said secondary membrane retentate into a supplemental secondary retentate and a supplemental secondary permeate.

5. The process of claim 4, wherein the solute concentration of either of said primary membrane permeate or said supplemental primary membrane permeate is greater than the solute concentration of either of said secondary membrane permeate or said supplemental secondary membrane permeate.

6. The process of claim 3, further including a plurality of supplemental nanofiltration primary membranes connected in series.

7. The process of claim 6, further including a plurality of supplemental reverse osmosis secondary membranes connected in series.

8. The process of claim 1, further including sequentially feeding said secondary membrane retentate to a supplemental secondary membrane for separating said secondary membrane retentate into a supplemental secondary retentate and a supplemental secondary permeate.

9. The process of claim 8, wherein there is a plurality of supplemental secondary membranes connected in series.

10. A process for membrane separation of a supply of potable tap water for obtaining a treated drinking water product having desired taste characteristics, comprising:

determining the number of primary membrane units and the number of secondary membrane units to obtain a water product having desired taste characteristics based on physical properties of said supply tap water, said desired taste characteristics being represented by a hardness value in the approximate range of between 20–100 ppm and an alkalinity value in the approximate range of between 21 and 100 ppm;

feeding said tap water to a first primary membrane, said first primary membrane separating said water into a first primary membrane retentate retained by said first primary membrane, and a first primary membrane permeate;

feeding said first primary membrane retentate directly and uninterrupted to a supplemental primary membrane, said supplemental primary membrane separating said first primary membrane retentate into a supplemental primary membrane retentate retained by said supplemental primary membrane, and a supplemental primary membrane permeate;

repeating said second feeding step until said supplemental primary membrane retentate has been fed to the number of primary membrane units established in said determining step, feeding the retentate from each unit to a subsequent unit until a last primary membrane retentate is formed;

feeding said last primary membrane retentate directly and uninterrupted to a first secondary membrane, said first secondary membrane separating said second primary membrane retentate into a first secondary membrane retentate retained by said first secondary membrane, and a first secondary membrane permeate;

feeding said first secondary membrane retentate directly and uninterrupted to a supplemental secondary membrane, said supplemental secondary membrane separating said first secondary membrane retentate into a supplemental secondary membrane retentate retained by said supplemental secondary membrane, and a supplemental secondary membrane permeate;

repeating said fourth feeding step until said supplemental secondary membrane retentate has been fed to the number of secondary membrane units established in said determining step, feeding said retentate from each unit to a subsequent unit until a last secondary membrane retentate is formed;

and blending all of said primary membrane permeates and said secondary membrane permeates to form a product liquid;

wherein said primary membranes are nanofiltration membranes, and said secondary membranes are reverse osmosis membranes and said primary membrane unit permeates have a higher solute concentration than said secondary membrane unit permeates, and said blending of permeates having distinct concentrations creates a drinking water product having desired taste characteristics without adding supplemental minerals or untreated water post treatment, said process including adjusting the number of at least one of said primary membrane units and said secondary membrane units to achieve taste characteristics in the product liquid within said range.

11. The process of claim 10 further including at least one supplemental nanofiltration primary membrane connected in series to said second primary membrane.

12. The process of claim 10 further including at least one supplemental reverse osmosis secondary membrane connected in series to said second secondary membrane.

* * * * *